(12) United States Patent
Reed et al.

(10) Patent No.: US 12,095,401 B2
(45) Date of Patent: Sep. 17, 2024

(54) DYNAMIC LOAD SYSTEM AND METHOD FOR SIMULATING A CROSSING GATE MECHANISM

(71) Applicant: Siemens Mobility, Inc., New York, NY (US)

(72) Inventors: Quinton Reed, Oil City, PA (US); Richard C. Bohme, Louisville, KY (US); Daniel Spencer, Pittsburgh, PA (US)

(73) Assignee: Siemens Mobility, Inc., New York, NY (US)

( * ) Notice: Subject to any disclaimer, the term of this patent is extended or adjusted under 35 U.S.C. 154(b) by 755 days.

(21) Appl. No.: 17/358,143

(22) Filed: Jun. 25, 2021

(65) Prior Publication Data

US 2022/0416693 A1 Dec. 29, 2022

(51) Int. Cl.
*B61L 29/04* (2006.01)
*B61L 29/22* (2006.01)
*G01L 5/26* (2006.01)
*H02P 5/50* (2016.01)

(52) U.S. Cl.
CPC ............... *H02P 5/50* (2013.01); *B61L 29/04* (2013.01); *B61L 29/22* (2013.01); *G01L 5/26* (2013.01)

(58) Field of Classification Search
CPC .......... B61L 29/22; B61L 29/30; B61L 29/04; B61L 29/08; B61L 29/16; B61L 29/28; H02P 5/50; H02P 23/0031; G01L 5/26
USPC ...................... 246/114 R, 125, 293
See application file for complete search history.

(56) References Cited

U.S. PATENT DOCUMENTS

| | | | | | |
|---|---|---|---|---|---|
| 3,898,875 | A | * | 8/1975 | Knoop | G01L 3/22 73/116.05 |
| 5,623,104 | A | * | 4/1997 | Suga | G01R 31/343 73/116.05 |
| 7,157,878 | B2 | * | 1/2007 | Collier-Hallman | H02P 6/15 318/567 |
| 2005/0284987 | A1 | * | 12/2005 | Kande | B61L 29/16 246/125 |
| 2014/0312178 | A1 | * | 10/2014 | Bohme | B61L 29/10 246/125 |
| 2021/0001908 | A1 | * | 1/2021 | Bohme | B61L 29/22 |

* cited by examiner

*Primary Examiner* — Zachary L Kuhfuss

(57) ABSTRACT

A dynamic load system includes a first electric machine simulating a load, a second electric machine, a coupling device for mechanically coupling the first electric machine to the second electric machine, a control unit with a processor and connected to the first electric machine and the second electric machine, wherein the control unit is configured to control the first electric machine and the second electric machine, wherein a reference value of the second electric machine is utilized to achieve a specific performance of the first electric machine.

18 Claims, 3 Drawing Sheets

DYNAMIC LOAD SYSTEM AND METHOD FOR SIMULATING A CROSSING GATE MECHANISM

BACKGROUND

1. Field

Aspects of the present disclosure generally relate to a dynamic load system, specifically a motor controlled dynamic load system, and associated method, for example for use in connection with railroad grade crossings and crossing gate mechanisms.

2. Description of the Related Art

Railroad grade crossings, sometimes referred to as level crossings, are locations at which railroad tracks intersect roads. A constant warning time device, also referred to as a grade crossing predictor (GCP) or a level crossing predictor, is an electronic device that is connected to the rails of a railroad track and is configured to detect the presence of an approaching train and determine its speed and distance from a railroad grade crossing. The constant warning time device, in combination with a crossing controller, will use this information to generate constant warning time signal(s) for controlling crossing warning device(s).

Crossing warning devices are devices that warn of the approach of a train at a crossing, examples of which include crossing gate arms (e.g., the familiar red and white striped wooden, fiberglass or aluminum arms often found at highway grade crossings to warn motorists of an approaching train), crossing lights (such as the red flashing lights often found at highway grade crossings in conjunction with the crossing gate arms), and/or crossing bells or other audio alarm devices.

A crossing gate serves as a barrier across a highway when a train is approaching or occupying a crossing. The crossing gate is typically combined with a standard flashing light signal that provides additional warning before the arm starts to descend, while the gate arm is across the highway, and until the gate arm ascends to clearance. A gate mechanism contains mechanical and electrical devices to control the gate. The gate mechanism is either supported on the same post with the flashing light signal or separately mounted on a pedestal adjacent to the flashing light signal post.

Crossing gate mechanisms are developed, improved, and tested. Currently, for developing or testing a gate mechanism, a full gate mechanism setup, including gate arm, is required which is costly to setup and maintain. The setup may also be dangerous and requires warning to not go near during operation as the weight of the gate arm(s) can injure people.

SUMMARY

Briefly described, aspects of the present disclosure provide a dynamic load system, specifically a motor controlled dynamic load system, and a method for simulating a crossing gate mechanism. However, it should be noted that the dynamic load system and associated method may be used for other applications, for example for testing electric motors according to specific requirements.

A first aspect of the present disclosure provides a dynamic load system comprising a first electric machine simulating a load, a second electric machine, a coupling device for mechanically coupling the first electric machine to the second electric machine, a control unit comprising at least one processor and connected to the first electric machine and the second electric machine, wherein the control unit is configured to control the first electric machine and the second electric machine, wherein a reference value of the second electric machine is utilized to achieve a specific performance of the first electric machine.

A second aspect of the present provides a method for simulating a crossing gate mechanism, the method comprising mechanically coupling a first electric machine to a second electric machine, powering the first electric machine and the second electric machine, obtaining a reference value of the second electric machine, and controlling the first electric machine to achieve a specific performance based on the reference value of the second electric machine.

DETAILED DESCRIPTION

To facilitate an understanding of embodiments, principles, and features of the present disclosure, they are explained hereinafter with reference to implementation in illustrative embodiments. In particular, they are described in the context of a dynamic load system and associated method, utilized for example in connection with railroad crossing gate applications.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
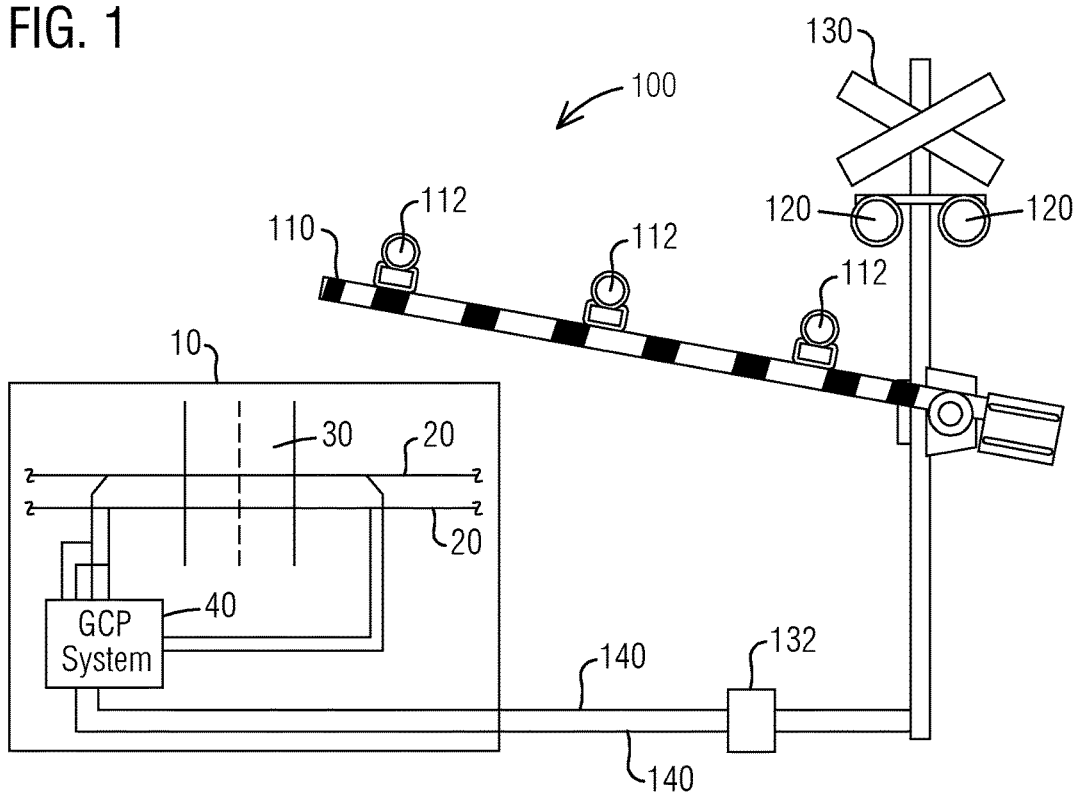
FIG. 1 illustrates an example railroad grade crossing, also referred to as level crossing, in accordance with an exemplary embodiment of the present disclosure.

FIG. 1 illustrates an example railroad grade crossing 100, also referred to as level crossing, in accordance with an exemplary embodiment of the present disclosure.

The railroad grade crossing 100 includes multiple railroad crossing warning devices, also referred to as grade crossing warning devices, which warn of an approach of a railroad vehicle, e. g. train, at the crossing of road 30 and railroad track 20. The railroad crossing warning devices include for example a crossing gate arm 110 with (or without) gate arm lights 112 spaced along the arm 110, crossing lights 120, railroad crossbuck 130, and/or other devices not illustrated herein, as for example crossing bells or other audio alarm devices. The crossing warning devices 110, 120, 130 are in communication with a constant warning time device 40, also referred to as grade crossing predictor or GCP, via connecting elements 140, which are for example electric cables. It should be noted that the components of FIG. 1 are illustrated schematically and are not drawn to scale, in particular are not drawn to scale in relation to each other.

The constant warning time device or GCP 40 is configured to detect the presence of an approaching train, determine its speed and distance from the railroad crossing, calculates when the train will arrive at the crossing, and uses this information to generate constant warning time signals for controlling the crossing warning devices 110, 120, 130. Typically, a normally energized master relay 132, only shown schematically herein, is arranged between the GCP 40 and the warning devices 110, 120, 130, for example along the connecting elements 140 and operably coupled by the connecting elements 140, wherein an output of the GCP 40 feeds a coil of the master relay 132. According to a pre-programmed time, for example a number of seconds and/or minutes, before projected arrival time of the approaching train, the GCP 40 is configured such that the output feeding the coil of the master relay 132 is turned off to drop the master relay 132 and to activate the crossing warning devices 110, 120, 130. It should be noted that the GCP 40, the master relay 132 and the warning time devices 110, 120, 130 will not be described in further detail as those of ordinary skill in the art are familiar with these devices and systems.

Figure 2:
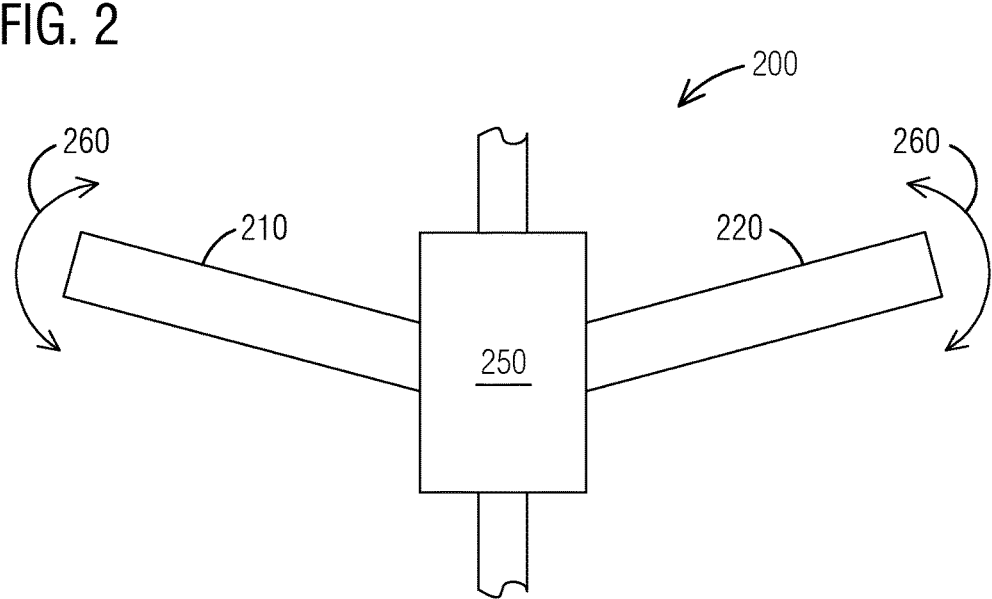
FIG. 2 illustrates a simplified view of a railroad crossing gate application in accordance with an exemplary embodiment of the present disclosure.

FIG. 2 illustrates a simplified view of a railroad crossing gate application 200 with sidewalk arm in accordance with an exemplary embodiment of the present disclosure. The railroad crossing gate application 200 is a crossing warning device and can be located at a crossing 100 as illustrated in FIG. 1, wherein the crossing warning device 110 can be configured as crossing gate 200.

The railroad crossing gate 200 comprises a first crossing gate arm 210 and a second crossing gate arm 220 which serve as barriers across a road or highway or sidewalk when a railroad vehicle, e. g. train, is approaching or occupying a crossing. The first crossing gate arm 210 can be configured as vehicle arm for roads, highways etc., and the second crossing gate arm 220 can be configured as pedestrian arm for sidewalks, or vice versa. It should be noted that the vehicle arm 210 is typically longer than the pedestrian arm 220. The gate arms 210, 220 may comprise gate arm lights spaced along the arms 210, 220.

The railroad crossing gate 200 further comprises a gate mechanism 250 for operating the crossing gate arms 210, 220. Such mechanisms 250 comprise for example a gear train in combination with an electric motor for moving the gate arms 210, 220 from a vertical position (when the gates are open) to a horizontal position (when the gates are closed). Direction of movement of the gate arms 210, 220 is illustrated by arrows 260.

Figure 3:
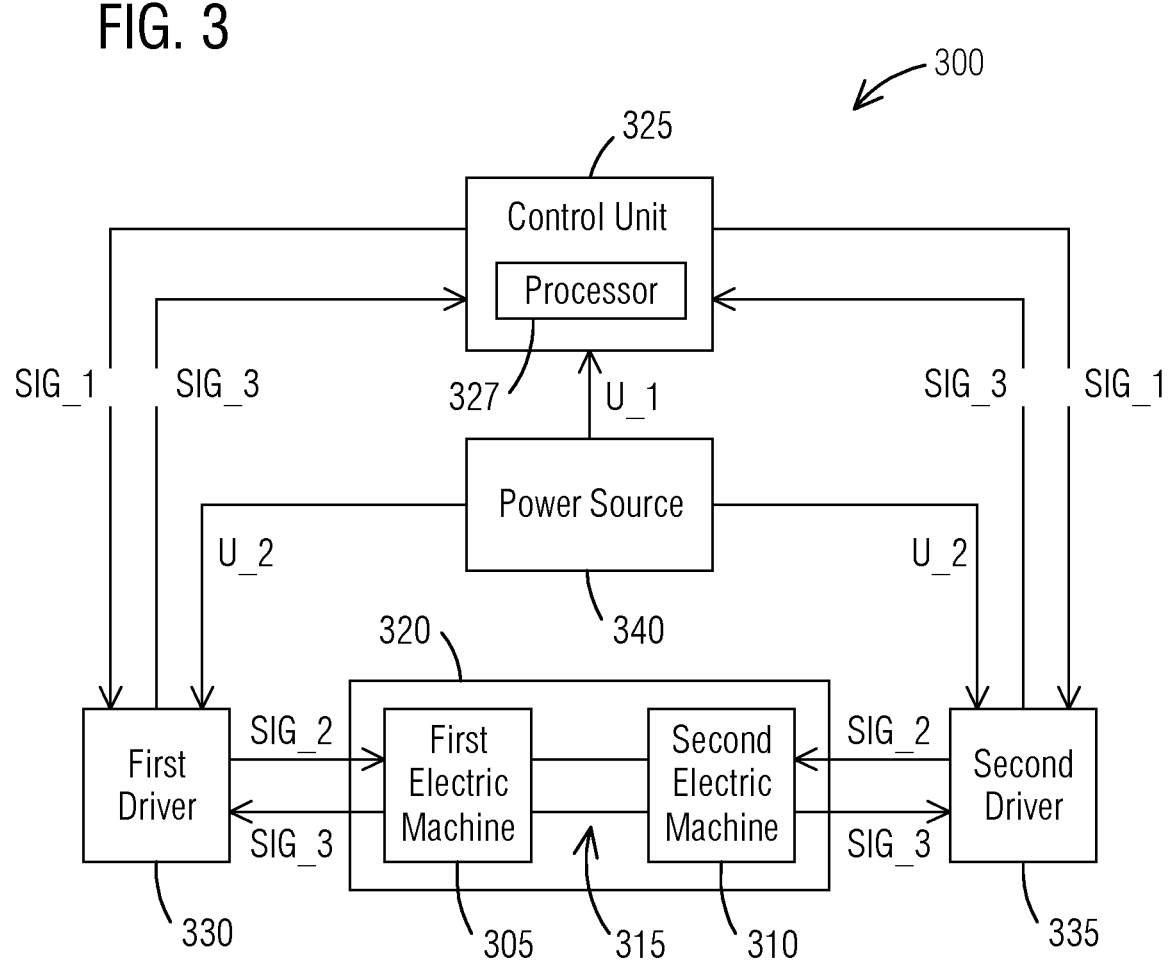
FIG. 3 illustrates a diagram of a dynamic load system in accordance with an exemplary embodiment of the present disclosure.

FIG. 3 illustrates a diagram of a dynamic load system 300 in accordance with an exemplary embodiment of the present disclosure.

As noted earlier, crossing gate mechanisms, such as for example gate mechanism 250 of FIG. 2, are developed, improved, and tested. Currently, for developing or testing a gate mechanism, a full gate mechanism setup, including gate arm, is required which is costly to setup and maintain. The setup may also be dangerous and requires warning to not go near during operation as the weight of the gate arm(s) can injure people.

The dynamic load system 300 provides and allows developing and testing gate mechanisms, specifically electric motors that are used to operate gate arms, at a bench test level without setup of a complete gate mechanism including gate arm.

In an exemplary embodiment of the present disclosure, the dynamic load system 300 comprises a first electric machine 305 simulating a load, a second electric machine 310, and a coupling device 315 for mechanically coupling the first electric machine 305 to the second electric machine 310.

The first electric machine 305 simulates a load, specifically a crossing gate arm of a crossing gate mechanism. The electric machine 305 is an electric motor, for example a brushed or brushless direct current (DC) motor. The first electric machine 305 is herein also referred to as 'load motor' 305.

The second electric machine 310 represents an electric crossing gate motor, for example a brushless DC motor, that is used in a gate mechanism for operating the crossing gate arm (here, the crossing gate arm is simulated by the load motor 305). The second electric machine 310 is herein also referred to as 'test motor' 310. The dynamic load system 300 can be used to develop, improve, inspect, or test the test motor 310.

The load motor 305 and test motor 310 are mechanically coupled to each other, for example via coupling device 315. The motors 305, 310 can be coupled through a set of gears or through a direct coupling system, maintaining essentially a ratio of 1:1 between the electric motors 305, 310. However, other ratios between the load motor 305 and test motor 310 may be used and suitable as long as RPM (revolutions per minute) and torque ratings are similar after gearing up or gearing down the motors 305, 310. The load motor 305, test motor 310 and coupling device 315 can be housed in an enclosure 320.

The dynamic load system 300 further comprise a control unit 325 comprising at least one processor 327 and connected to the first electric machine 305 and the second electric machine 310. In an example, the control unit 325 is connected to the first electric machine 305 via first driver 330, and to the second electric machine 310 via second driver 335. The first driver 330 is configured to drive the first electric machine 305, and the second driver 335 configured to drive the second electric machine 310.

A power source 340 is configured to power the control unit 325 with the at least one processor 327, the first driver 330, and the second driver 335. The power source 340 provides low voltage power $U\_1$, for example 5 volts [V] or less, to the control unit 325. The drivers 330, 335 may receive high voltage power $U\_2$, for example 12V or more, from the power source 340.

In operation, the control unit 325 provides signals, specifically gate driver signals SIG 1, to both drivers 330, 335. The drivers 330, 335 in turn provide signals, specifically phase outputs signals SIG_2, to the respective electric machine 305, 310. On the other hand, the load motor 305 and test motor 310 provide rotor feedback signals SIG_3 to the respective driver 330, 335, wherein the respective driver 330, 335 then provides the rotor feedback signals SIG_3 to the control unit 325. It should be noted that rotor feedback may only be provided if the respective motor 305, 310 is configured as brushless DC motor. At least one of the electric machines 305, 310, in our example the test motor 310, should be a brushless motor to be able to receive rotor feedback. The other electric machine, in our example the load motor 305, can be a brushed or brushless DC motor. In case the other machine, e. g. the load motor 305, is configured as brushed DC motor, rotor feedback may not be provided due to the capabilities and construction of a brushed motor.

The load motor 305 provides a dynamic load for the test motor 310 by dynamic braking or actively driving against the test motor 310. In the example of a crossing gate mechanism with simulation of a gate arm, the load motor 305 resists on a rising action of the simulated gate arm and then assists the test motor 310 on a lowering action of the simulated gate arm.

Figure 4:
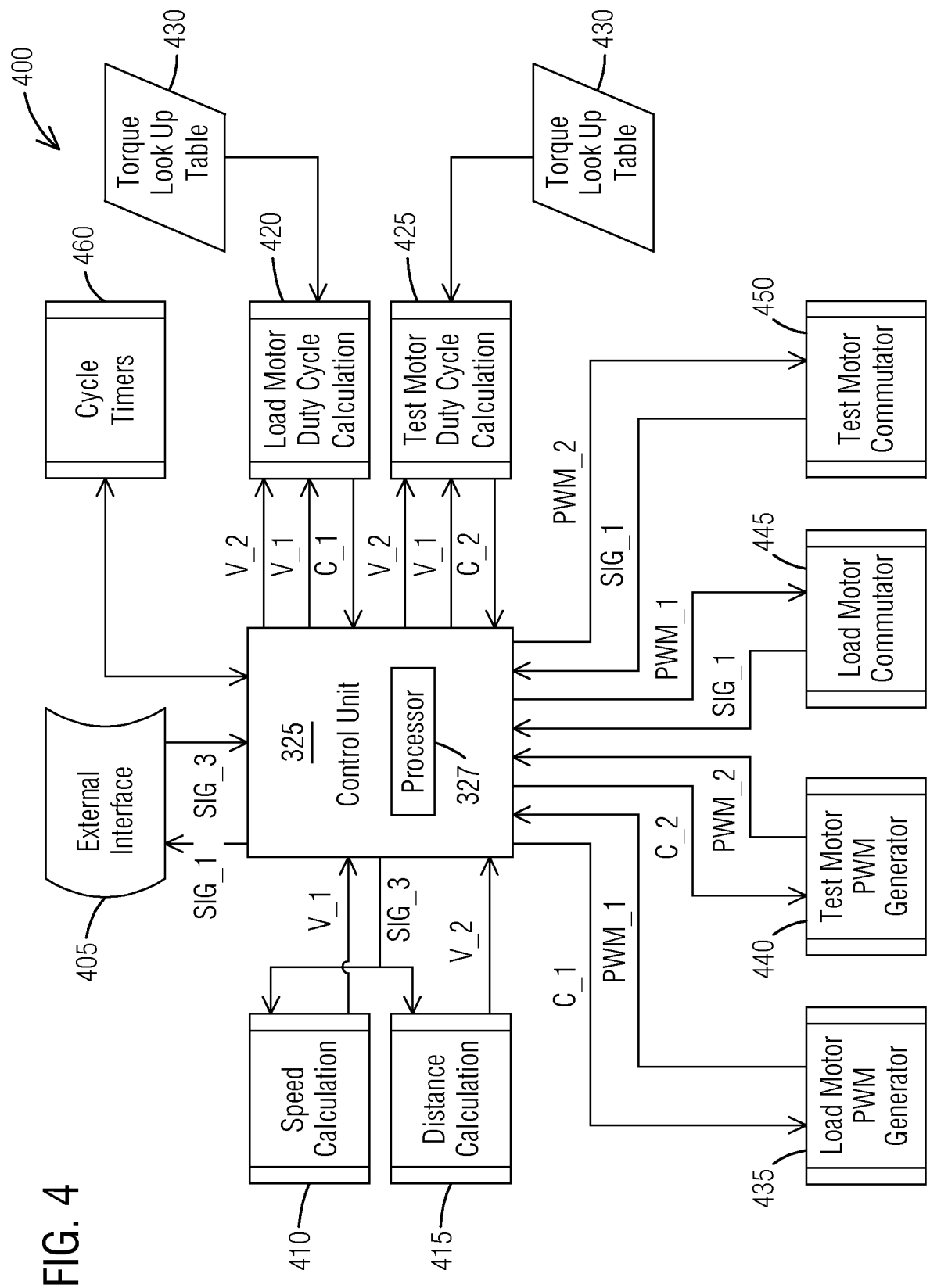
FIG. 4 illustrates a diagram of a control system of a dynamic load system in accordance with an exemplary embodiment of the present disclosure.

FIG. 4 illustrates a diagram of a control system 400 of a dynamic load system in accordance with an exemplary embodiment of the present disclosure.

The control system 400 can be used for the dynamic load system 300 as described with reference to FIG. 3 and comprises control unit 325 with at least one processor 327. Of course, the control system 400/control unit 325 may comprise multiple processors.

The control unit 325 is in communication with external interfaces 405, the external interfaces comprising for example the load motor 305, test motor 310, first driver 330, second driver 335. The control unit 325 provides signals, such as gate signals SIG 1 to the external interfaces 405 and receives feedback signals, such as rotor feedback signals SIG_3 from the interfaces 405.

The control unit 325 processes the received rotor feedback signals SIG_3 and, based on the signals, performs calculations, such as speed calculation 410 and distance calculation 415. Based on calculated speed V_1 and calculated position V_2, the control unit 325 outputs signals, such a gate signals SIG_1, for operation of the load motor 305 and/or test motor 310 to achieve a desired simulation of a crossing gate arm.

In an exemplary embodiment, a reference value of the test motor 310 is utilized to achieve a specific performance of the first electric machine 305. Specifically, speed reference, i. e. speed value V_1, of a rotor of the test motor 310 is utilized to determine and achieve a specific or desired torque of the load motor 305.

In an example, the load motor 305 comprises a brushed DC motor and the test motor 310 comprises a brushless DC motor. As noted earlier, at least one of the motors should be a brushless motor to be able to obtain a speed reference. Generally, the dynamic load system 300 operates by having the control system 325 control/drive (via second driver 335) the test motor 310.

When powering both load motor 305 and test motor 310, both motors 305, 310 will start spinning initially which will provide a speed reference (speed value V_1) of the test motor 310 (based on rotor feedback SIG_3, speed values V_1 can be determined or calculated). For obtaining and providing the speed reference/value, the test motor 310 can comprise for example hall sensors, encoders, or other sensors suitable for providing speed references/values.

The obtained speed reference/value V_1 is then used to determine an amount of voltage or duty cycle needed to drive the load motor 305 to achieve a desired torque (resistance). Such a determination or calculation can be done by using characteristics of the load motor 305 to set up a reactionary profile. Since in our example the load motor 305 is a brushed motor, such characteristic can include KT (torque per phase current) and KE (line voltage per mechanical rotor velocity) constants of the load motor 305.

With reference to FIG. 4, the control system 400 performs duty cycle calculations, such as load motor duty cycle calculation 420 and test motor duty cycle calculation 425. In an example, the duty cycle calculations 420, 425 can be performed using a look up table, such as torque look up table 430. With respect to the load motor duty cycle calculation 420, a speed v. torque curve can be obtained or imported from the look up table 430. For the test motor duty cycle calculation 425, a speed v. position curve is provided by the look up table 430. Based on the calculations 420, 425, a duty cycle C_1 for the load motor 305 and a duty cycle C_2 for the test motor 310 is calculated/created.

In another example, the look up table 430 is configurable. The look up table 430 may be a fixed table that can be configured and imported, i. e. CSV or excel file, by a tester or user of the system 400. A more comprehensive design may include configurability through a user interface and ability to dynamically change the look up table 430 as needed.

Based on the created duty cycles C_1 and C_2, parameters, values and/or signals are calculated, which are then used for controlling and regulating load motor 305, test motor 310 and drivers 330, 335. For example, based on duty cycles C_1 and C_2, pulse-width modulation (PWM) can be performed/generated for the load motor 305 and the test motor 310. Load motor PWM generator 435 and test motor PWM generator 440 create and provide PWM data PWM_1 and PWM_2 to the control unit 325.

Utilizing PWM_1 and PWM_2, gate signals for both the load motor 305 and the test motor 310 can then be calculated. In our example, load motor commutator 445 calculates gate signals SIG_1 for the load motor 305, and test motor commutator calculates gate signals SIG_1 for the test motor 310.

Further, the control system 400 may comprise cycle timers 460 that can be used to periodically turn ON and OFF the load motor 305 and/or the test motor 310 for stipulated time intervals.

The control unit 325 is configured to perform a closed loop control that regulates the voltage of the load motor 305 to align with the desired torque, for example set by a user. A specific or desired torque value can be changed to any setting, within capability of the load motor 305. For example, a torque value can be set using an equation and distance, as in our example of the simulation of a gate mechanism/gate arm, wherein the load (simulated by the load motor 305) varies based on distance (position) the test motor 310 has travelled, which simulates a varying load that a gate arm presents as it swings/travels through its motion up and down.

The dynamic load system 300 and control system 400 is versatile as they allow configuration of the load, e. g. load motor 305, such that many different load profiles for the load motor 305 can be created. The load motor 305 is controlled and operated according to a load profile, for example according to a specific gate arm that is to be simulated. A gate arm may be 40 feet long, wherein another gate arm may only be 10 feet long. Different gate arms represent different loads which can be represented and simulated by different load profiles. Further, by using different load profiles, unsafe crossing gate conditions without actually creating an unsafe situation can be simulated.

In another embodiment, instead of brushed DC motor, the load motor 305 may comprise a brushless DC motor. When using a brushed motor for the load motor 305, a holding torque is typically not possible when in the initial drive phase, because there is no speed reference available and without speed reference, an amount of flux in windings which produces the torque cannot be controlled. With a brushless DC motor for the load motor 305, a holding torque is possible using for example field-oriented control and a feedback system that monitors motor current. Field-oriented control allows the load motor 305 to produce positive and negative torque in all directions effectively, thereby able to simulate many different loads, as desired for example by a user.

In another exemplary embodiment of the present disclosure, a method for simulating a crossing gate mechanism is provided. The method may be performed utilizing a dynamic load system 300 as described with reference to FIG. 3 and a control system 400 as described with reference to FIG. 4.

While the method is described as a series of acts or steps that are performed in a sequence, it is to be understood that the method may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The method comprises mechanically coupling a first electric machine 305 to a second electric machine 310, powering the first electric machine 305 and the second electric machine 310, obtaining a reference value of the second electric machine 310, and controlling the first electric machine 305 to achieve a specific performance based on the reference value of the second electric machine 310.

The specific performance comprises a torque of the first electric machine 305, and wherein obtaining the reference value of the second electric machine 310 comprises obtaining a speed value of the second electric machine 310. To achieve a specific torque of the first electric machine 305, a voltage of the first electric machine 305 is regulated. The voltage of the first electric machine 305 is regulated to align with the specific torque of the second electric machine 310 via a closed loop control, for example utilizing control system 400. In embodiment, the method comprises controlling the first electric machine 305 according to a load profile, wherein the load profile simulates a varying load of a crossing gate arm.

In an example, the first electric machine 305 comprises an electric motor and simulates a crossing gate arm of a crossing gate mechanism, and the second electric machine 310 comprises an electric crossing gate motor.

It should be appreciated that acts associated with the above-described methodologies, features, and functions (other than any described manual acts) may be carried out by one or more data processing systems, such as for example control unit 327, via operation of at least one processor 327. As used herein, a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system.

The control unit 325 and/or processor 327 that is described or claimed as being configured to carry out a particular described/claimed process or function may correspond to a CPU that executes computer/processor executable instructions stored in a memory in form of software and/or firmware to carry out such a described/claimed process or function. However, it should also be appreciated that such a processor may correspond to an IC that is hard wired with processing circuitry (e.g., an FPGA or ASIC IC) to carry out such a described/claimed process or function.

With the dynamic load system 300 and associated method, many different load profiles and configurations can be achieved, for example clockwise cycle torque curves, counter-clockwise torque curves, clockwise runtime, counter-clockwise runtime, and a rest period at an end of a clockwise or counter-clockwise run. Additional features for the dynamic load system 300 may comprise current monitoring for more accurate torque estimation, temperature monitoring of the load motor 305 and test motor 310 as a safety feature, and a graphical user interface to configure the system 300 whenever desired or necessary.

The provided dynamic load system 300 with control system 400 and associated method allows electric motors and hardware to be qualified at a bench test level which requires significant less setup and less material. Further, the system 300 is a much safer and efficient compared to other solutions with actual gate mechanism including gate arm. Roughly 4 to 6 test benches can be used in a same space that one gate mechanism solution would occupy. Unsafe conditions can be tested without creating an unsafe condition, whereas with the other solutions including a gate mechanism and gate arm, someone may get hurt by equipment or devices may be damaged.

The invention claimed is:

1. A dynamic load system comprising:
a first electric machine simulating a load,
a second electric machine,
a coupling device for mechanically coupling the first electric machine to the second electric machine,
a control unit comprising at least one processor and connected to the first electric machine and the second electric machine,
wherein the control unit is configured to control the first electric machine and the second electric machine, wherein a reference value of the second electric machine is utilized to achieve a specific performance of the first electric machine,
wherein the first electric machine comprises an electric motor and simulates a crossing gate arm of a crossing gate mechanism.

2. The dynamic load system of claim 1,
wherein the first electric machine and the second electric machine each comprise an electric motor.

3. The dynamic load system of claim 1,
wherein the second electric machine comprises an electric crossing gate motor.

4. The dynamic load system of claim 1,
wherein the specified performance of the first electric machine comprises a specific torque.

5. The dynamic load system of claim 4,
wherein a speed value of the second electric machine is used to determine the specific torque of the first electric machine.

6. The dynamic load system of claim 4,
wherein the specific torque is achieved by regulating voltage of the first electric machine.

7. The dynamic load system of claim 6,
wherein the control unit is configured as closed loop control system that regulates the voltage of the first electric machine to align with the specific torque.

8. The dynamic load system of claim 4,
wherein the specific torque of the first electric machine comprises a clockwise cycle torque curve, a counter-clockwise cycle torque curve, a clockwise runtime, counter-clockwise runtime, or a rest period at the end of a clockwise or counter-clockwise run.

9. The dynamic load system of claim 1,
wherein the first electric machine is controlled according to a load profile.

10. The dynamic load system of claim 9,
wherein the load profile simulates a varying load.

11. The dynamic load system of claim 1, comprising:
a first driver configured to drive the first electric machine,
a second driver configured to drive the second electric machine, and a power source configured to power the first driver, the second driver and the control unit.

12. A method for simulating a crossing gate mechanism, the method comprising:
mechanically coupling a first electric machine to a second electric machine,
powering the first electric machine and the second electric machine,
obtaining a reference value of the second electric machine, and
controlling the first electric machine to achieve a specific performance based on the reference value of the second electric machine,
wherein the first electric machine comprises an electric motor and simulates a crossing gate arm of a crossing gate mechanism, and
wherein the second electric machine comprises an electric crossing gate motor.

13. The method of claim 12,
wherein the specific performance comprises a torque of the first electric machine.

14. The method of claim 13,
wherein obtaining the reference value of the second electric machine comprises obtaining a speed value of the second electric machine.

15. The method of claim 13,
regulating voltage of the first electric machine to achieve the torque.

16. The method of claim 15,
regulating the voltage of the first electric machine to align with the torque of the second electric machine via a closed loop control.

17. The method of claim 12,
controlling the first electric machine according to a load profile, wherein the load profile simulates a varying load.

18. The method of claim 12,
wherein the first electric machine and the second electric machine are each configured as electric motor.

* * * * *